United States Patent
Horng et al.

(10) Patent No.: US 6,845,512 B2
(45) Date of Patent: Jan. 18, 2005

(54) DEVICE WITH SPRING-LOADED CURVED TONGUES FOR HOLDING AN OPTICAL DISK AROUND A ROTARY SHAFT OF A MOTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 163 days.

(21) Appl. No.: 10/352,142

(22) Filed: Jan. 28, 2003

(65) Prior Publication Data

US 2004/0205803 A1 Oct. 14, 2004

(30) Foreign Application Priority Data

Dec. 25, 2002 (TW) ........................................ 91221579 U

(51) Int. Cl.$^7$ ........................ G11B 17/028; G11B 17/03; G11B 19/20
(52) U.S. Cl. ..................................................... 720/707
(58) Field of Search ................................. 720/707, 709, 720/712, 706, 704, 703, 695; 369/271.1, 270.1

(56) References Cited

U.S. PATENT DOCUMENTS

| 6,040,649 | A | * | 3/2000 | Horng | .................... | 310/91 |
| 6,363,048 | B1 | * | 3/2002 | Wu et al. | ................ | 369/271.1 |
| 6,487,162 | B1 | * | 11/2002 | Wu et al. | ................ | 369/271.1 |
| 6,525,441 | B2 | * | 2/2003 | Yamaguchi | .................. | 310/90 |
| 6,611,490 | B1 | * | 8/2003 | Bierhoff | .................. | 369/271.1 |

* cited by examiner

Primary Examiner—Julie Anne Watko
(74) Attorney, Agent, or Firm—Bacon & Thomas PLLC

(57) ABSTRACT

A device includes a casing having a plurality of equispaced openings formed around, and a plurality of spring-loaded radial tongues partially extended out from and retractable into the openings. Each of the radial tongues has a lower curved surface with a constant curvature in any imaginary contour line throughout at least one area of the lower curved surface. Furthermore, the constant curvature is exactly the same as the curvature of the rounded inner edge of the optical disk to be held.

4 Claims, 5 Drawing Sheets

DEVICE WITH SPRING-LOADED CURVED TONGUES FOR HOLDING AN OPTICAL DISK AROUND A ROTARY SHAFT OF A MOTOR

BACKGROUND OF THE INVENTION

1. Field of the Invention

The present invention relates to a device for holding an optical disk around a rotary shaft of a motor and, more particularly, to such a device in which a plurality of spring-loaded radial tongues are shaped in such a manner that the tongues may make contact with the rounded inner edge of the optical disk at a full contact length in spite of the thickness of the disk.

2. Description of Related Art

As shown in FIG. 1, a device 10 in prior art for holding an optical disk 2 around a rotary shaft (not shown) of a motor 1 includes a casing 11 having a plurality of equispaced openings 12 formed around, and a plurality of spring-loaded radial tongues 13 partially extended out from the openings 12.

These spring-loaded radial tongues 13, retractable into the openings 12, are provided for engaging with an rounded inner edge 20 of the optical disk 2 to hold and rotate the same disk 2.

Referring to FIGS. 2 and 3, each radial tongue 13 has an upper curved surface 13 1 and a lower curved surface 132, over which the rounded inner edge 20 of the optical disk 2 may slide to retract the tongue 13. When the disk 2 is held in place around the rotary shaft, the spring-loaded tongues 13 are extended out again until their lower curved surfaces 132 make contact with the rounded inner edge 20 of the disk 2. With such a contact, the optical disk 2 can be rotated by the tongues 13 synchronously with the rotation of the motor 1, as shown in FIG. 1.

In the prior art device 10, however, the lower curved surface 132 of each tongue 13 is curved differently from the rounded inner edge 20 of the optical disk 2. As can be clearly seen in FIGS. 2 and 3, they make contact with each other only at two points 21a and 21b, with an intervening clearance 21 remaining between the lower curved surface 132 and the rounded inner edge 20 of the disk 2.

The point contact is more disadvantageous to any optical disk 2 which is thinner than usual. This is because the spring-loaded tongue 13 is extended radially outward a little further and thus exerts a weaker force upon the disk 2. The reduced force at the contact points 21a and 21b impairs the ability of the tongues 13 to hold the disk 2 securely in place, and so the thinner disk 2 may slightly slide relative to the device 10 and rotates at a mismatched speed slower than that of the rotary shaft of the motor 1.

OBJECTS OF THE INVENTION

The object of the present invention is to provide a device in which a plurality of spring-loaded radial tongues are shaped in such a manner that the tongues may make contact with an rounded inner edge of the optical disk at a fill contact length, so as to avoid any sliding movement of the disk with respect to the device.

SUMMARY OF THE INVENTION

To achieve the aforementioned objects, the present invention provides a device including a casing having a plurality of equispaced openings formed around, and a plurality of spring-loaded radial tongues partially extended out from and retractable into the openings. Each of the radial tongues has a lower curved surface with a constant curvature in any imaginary contour line throughout at least one area of the lower curved surface, and the constant curvature is exactly the same as the curvature of the rounded inner edge of the optical disk to be held.

Other objects, advantages and novel features of this invention will become more apparent from the following detailed description when taken in conjunction with the accompanying drawings.

DETAILED DESCRIPTION OF THE PREFERRED EMBODIMENT

The present invention is now to be described hereinafter in detail by way of a preferred embodiment in reference to drawings.

Figure 1:
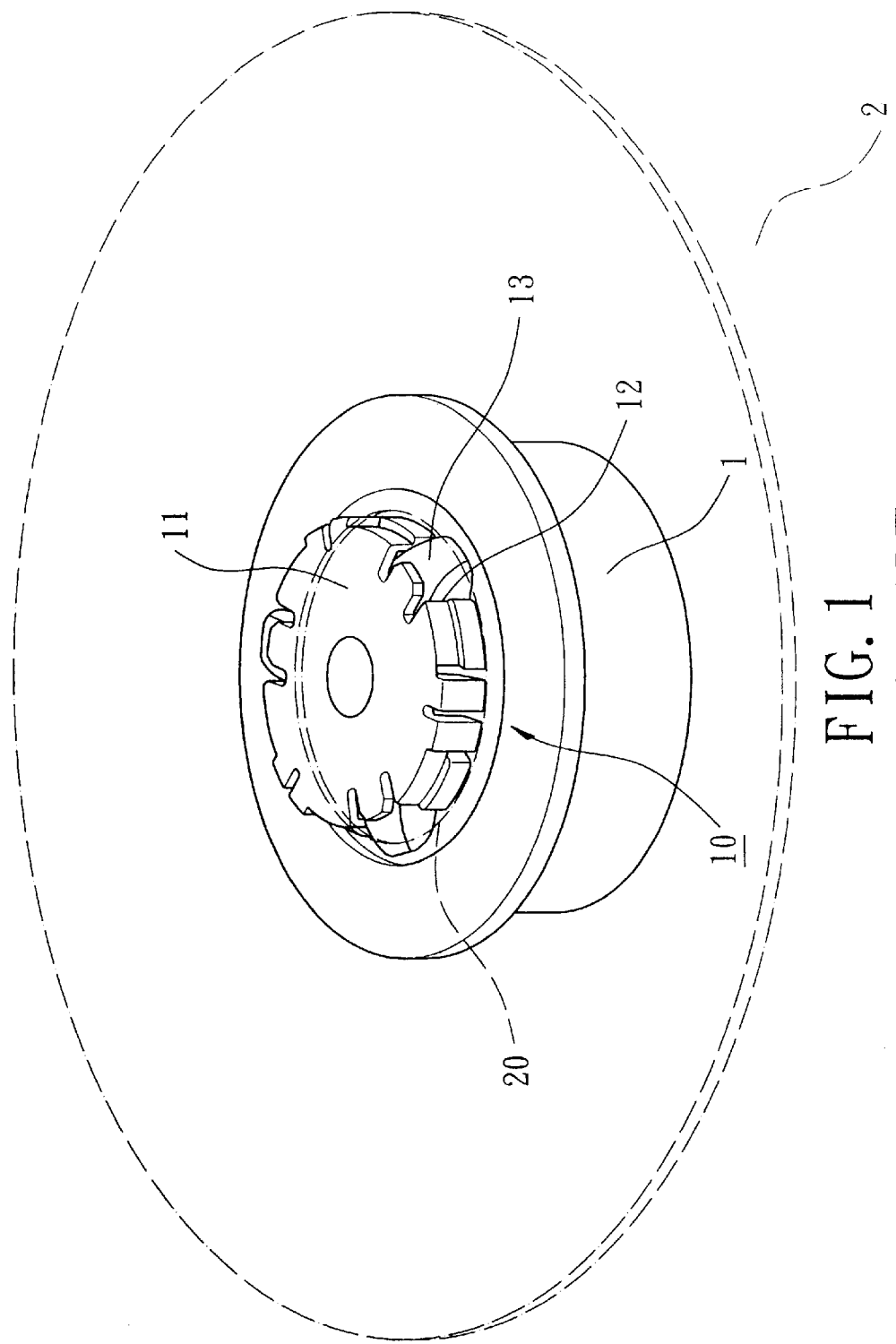
FIG. 1 is a perspective view of a device in prior art for holding an optical disk around a rotary shaft of a motor.
Figure 2:
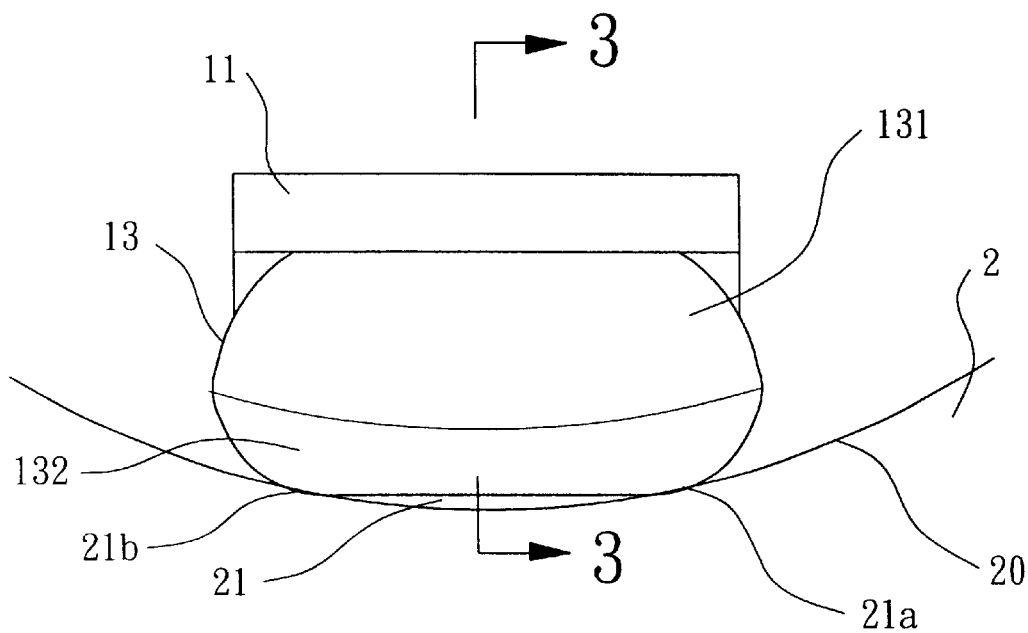
FIG. 2 is an enlarged top view of a spring-loaded radial tongue involved in the device of FIG. 1.
Figure 3:
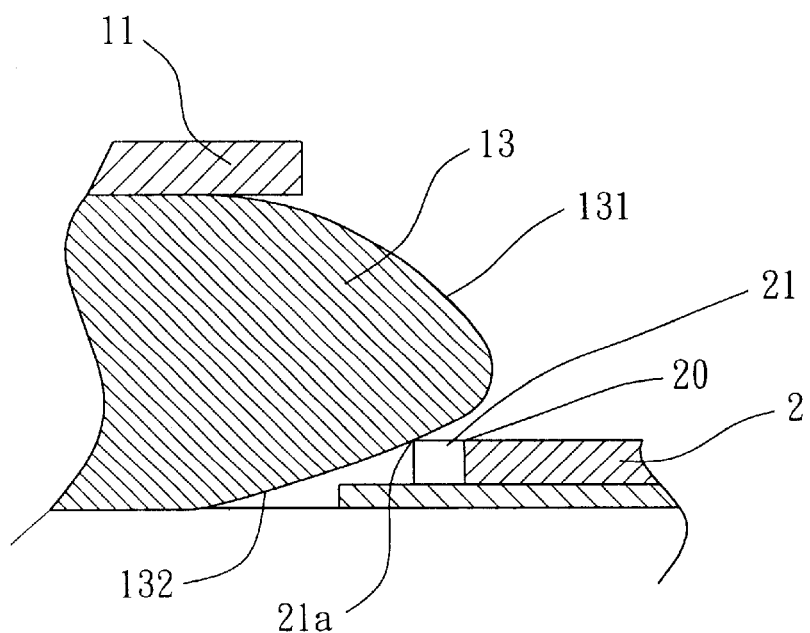
FIG. 3 is a cross-sectional view taken along lines 3—3 in FIG. 2.
Figure 4:
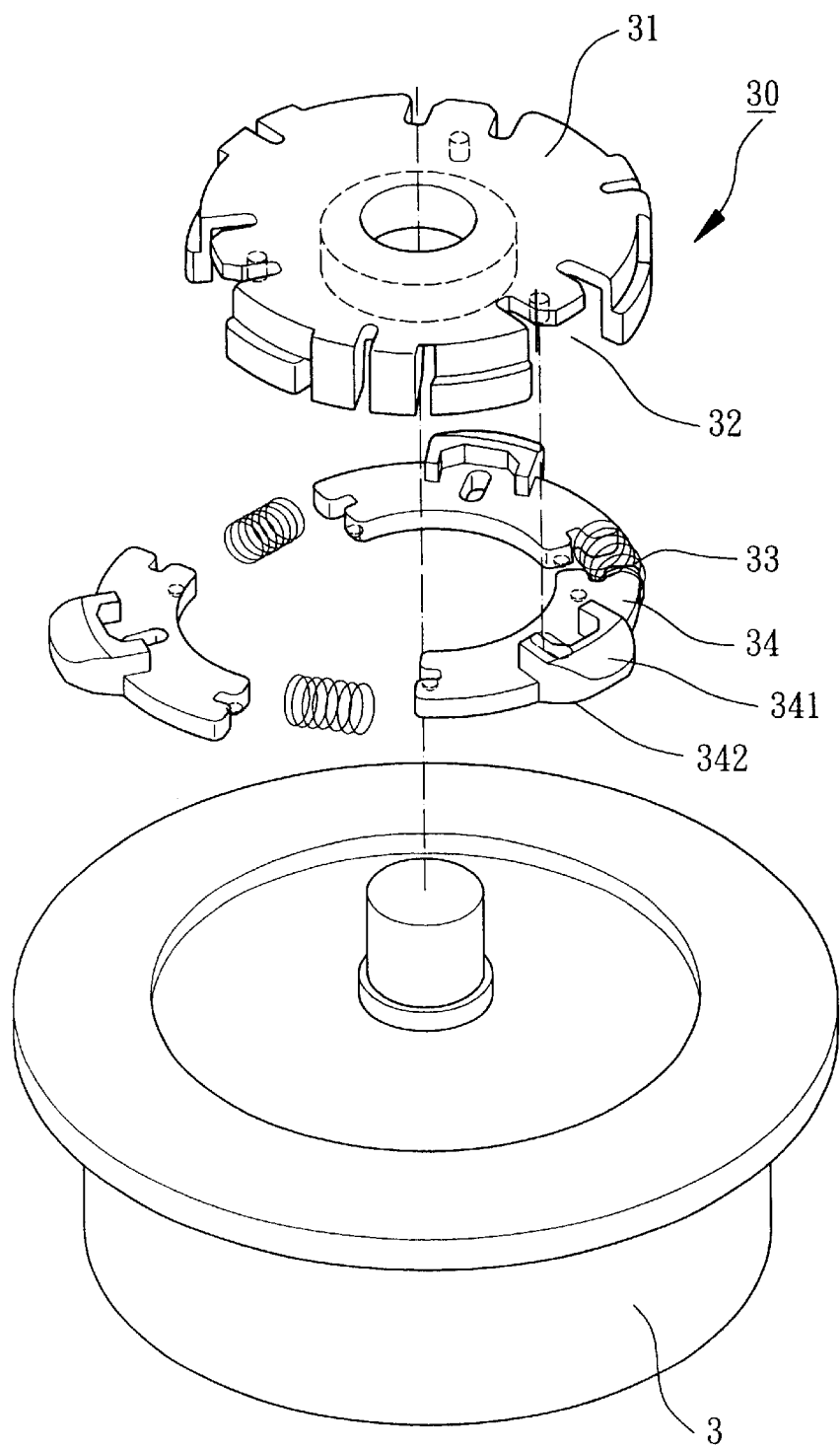
FIG. 4 is an exploded perspective view of a preferred embodiment of a device in accordance with the present invention for holding an optical disk around a rotary shaft of a motor.
Figure 5:
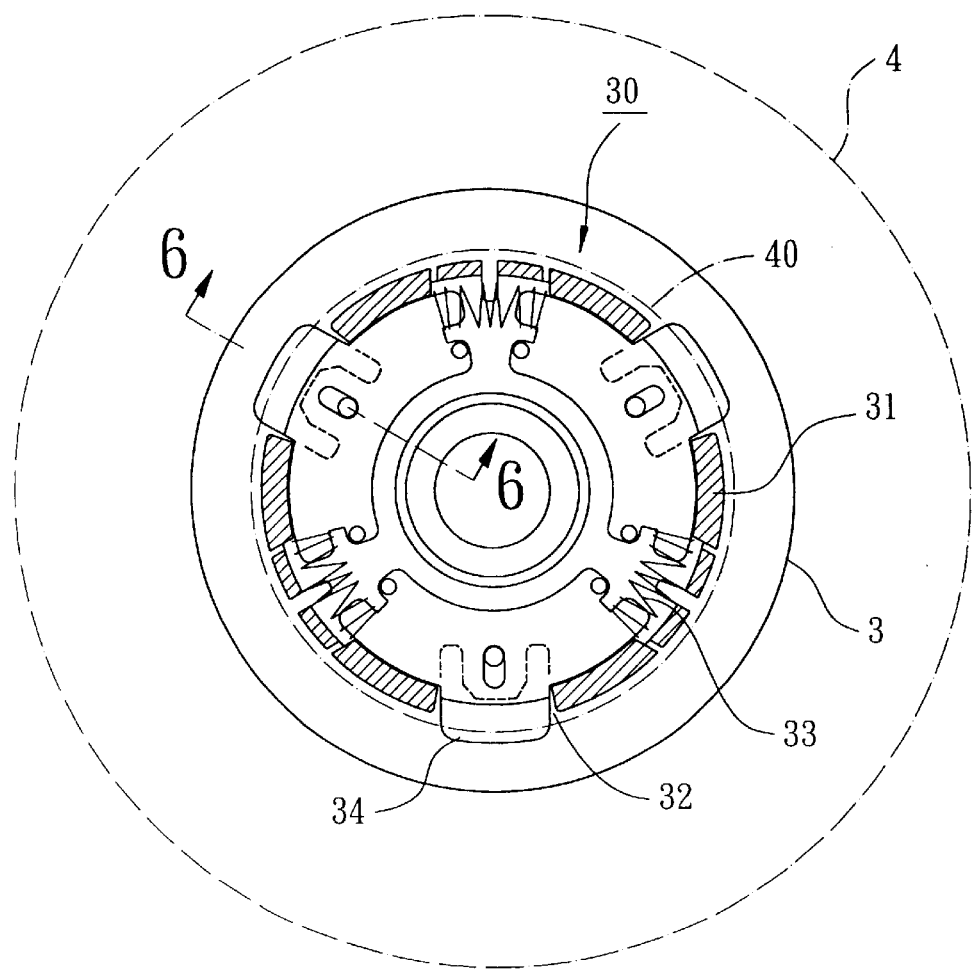
FIG. 5 is a top view, partially cut away, of the device of FIG. 4.

Referring to FIGS. 4 and 5, there is shown a preferred embodiment of an inventive device 30 for holding an optical disk 4 around a rotary shaft (not numbered) of a motor 3. The device 30 includes a casing 31 having a plurality of equispaced openings 32 formed around, and a plurality of spring-loaded radial tongues 34 partially extended out from the openings 32 for engagement with an rounded inner edge 40 of the optical disk 4.

The casing 31 is fastened to the rotary shaft of the motor 3, and the radial tongues 34 are partially received in the casing 31. Furthermore, the tongues 34 are spring-loaded, preferably by helical springs 33 each compressed between adjacent two of the tongues 34, in such a manner that the tongues 34 has an ability of being retractable radially into the openings 32 of the casing 31 when depressed but extendable radially out again from the openings 32 when released.

Figure 6:
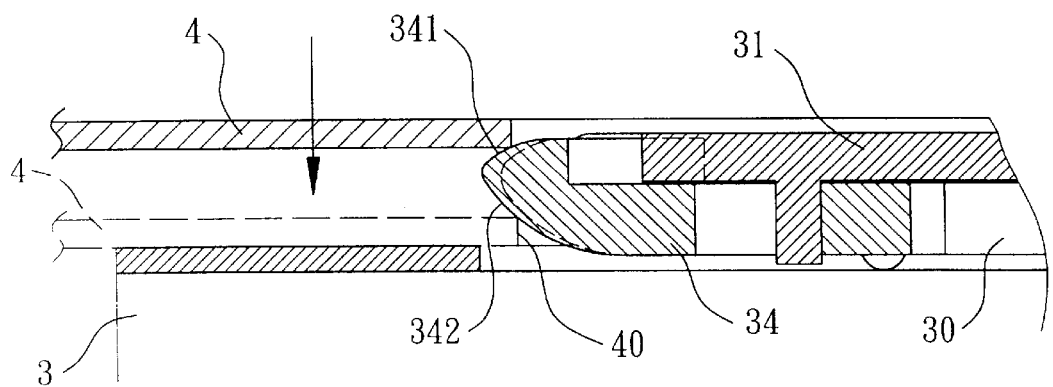
FIG. 6 is a cross-sectional view taken along lines 6—6 in FIG. 5, showing an optical disk to be held on the device of FIG. 4.

Referring to FIG. 6, the ability of the radial tongues 34 allows the optical disk 4 to be easily held on and removed from the inventive device 30 by sliding its rounded inner edge 40 over the spring-loaded tongues 34, which are then depressed and released during the movement of the disk 4 in the axial direction of the rotary shaft.

Referring to FIG. 6, each radial tongue 34 has an upper curved surface 341 and a lower curved surface 342, cambered inversely and sloped so that the tongue 34 are tapered radially outward.

In the inventive device 30, the curved surfaces 341 and 342 are each provided with a constant curvature at everywhere on any imaginary "contour line" throughout a predetermined area thereof. The term "contour line" here means a planar curved made by any imaginary horizontal plane which intersects the curved surface 341 or 342.

Furthermore, the constant curvature throughout the surfaces 341 and 342 is exactly the same as the curvature of the rounded inner edge 40 of the optical disk 4.

Figure 7:
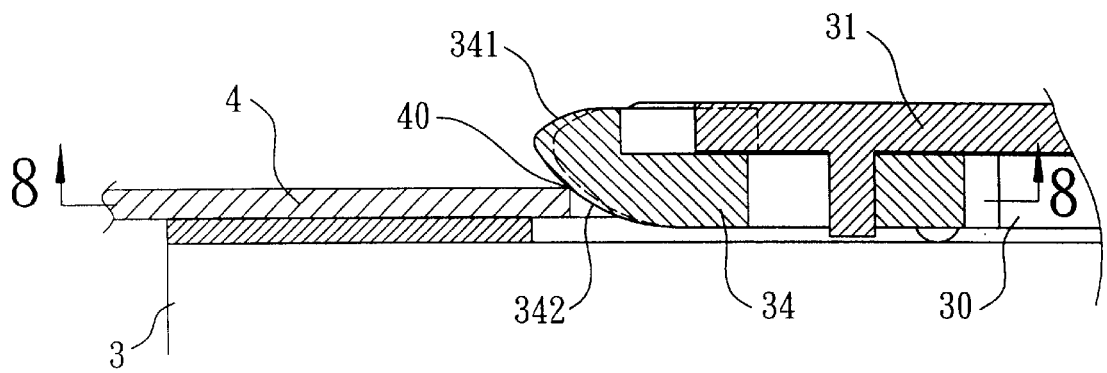
FIG. 7 is a cross-sectional view similar to FIG. 6, but showing the optical disk held on the device of FIG. 4.
Figure 8:
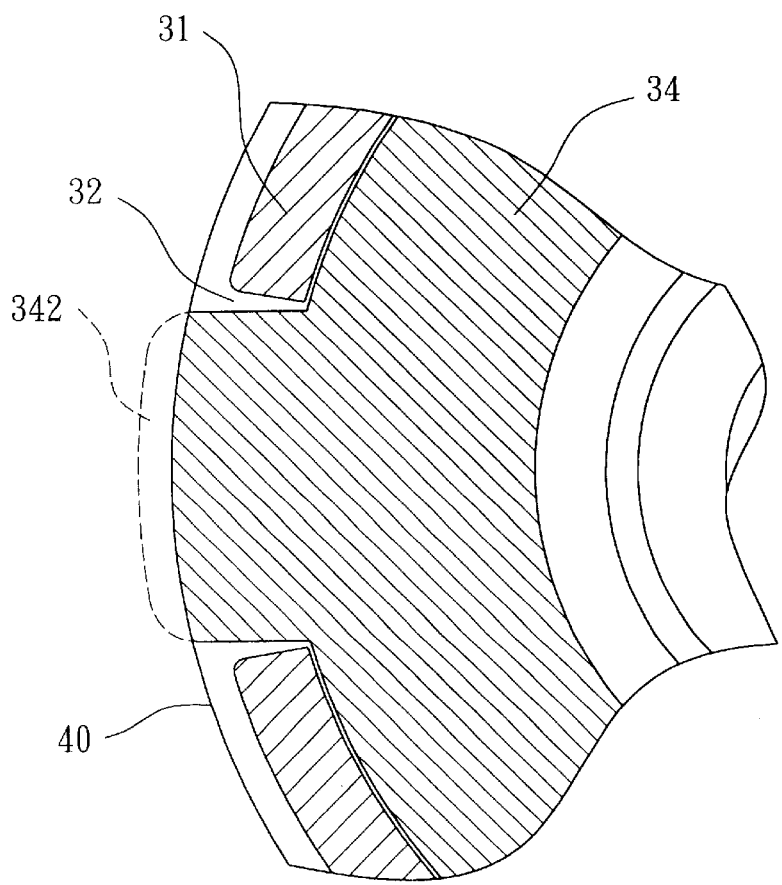
FIG. 8 is a cross-sectional view taken along lines 8—8 in FIG. 7.

Referring to FIGS. 7 and 8, the spring-loaded radial tongues 34 can hold the optical disk 4 in place, with their lower curved surfaces 342 engaged with the rounded inner edge 40 of the disk 4. With the same curvature, the lower curved surfaces 342 make contact with the rounded inner edge 40 at the full length of a contact line, as clearly shown in FIG. 8, thereby providing an elongated contact length and hence reducing the possibility of sliding movement of the optical disk 4 with respect to the device 30.

Any optical disk 40 thinner than usual can also be securely held in place by the spring-loaded radial tongues 34, which are now extended radially outward a little further until making contact with the rounded inner edge 40 of the optical disk 4 at the full length of a contact line. This line contact avoids the sliding movement of the optical disk 4 with respect to the tongues 34.

From the foregoing, it is apparent that this invention has the advantage of more securely holding an optical disk 40, thinner or usual, around the rotary shaft of the motor 3.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A device for holding an optical disk around a rotary shaft of a motor, comprising:

a casing adapted to be fastened to said rotary shaft of said motor; and a plurality of spring-loaded radial tongue each partially extended out of said casing for engagement with a rounded inner edge of said optical disk, each of said radial tongues having a lower curved surface with a constant curvature in any imaginary contour line throughout at least one area of said lower curved surface, said constant curvature being exactly the same as the curvature of said rounded inner edge of said optical disk;

whereby said lower curved surface may make contact with said rounded inner edge of said optical disk at a full contact length when said radial tongue is engaged with said rounded inner edge of said optical disk in said area of said lower curved surface.

2. The device as claimed in claim 1, wherein said casing has a plurality of openings formed around, and wherein said spring-loaded radial tongues are retractable into said openings when being depressed.

3. The device as claimed in claim 1 further including a plurality of springs each compressed between adjacent two of said spring-loaded radial tongues.

4. The device as claimed in claim 1, wherein each of said radial tongues has an upper curved surface with the same curvature as that of said lower curved surface.

* * * * *